3,070,522
Patented Dec. 25, 1962

3,070,522
PROCESS FOR ELECTROCHEMICALLY ETCHING TANTALUM FOIL
Preston Robinson, Williamstown, Mass., and Donald G. Rogers, Pownal, Vt., assignors to Sprague Electric Company, North Adams, Mass., a corporation of Massachusetts
No Drawing. Filed Nov. 8, 1957, Ser. No. 695,196
12 Claims. (Cl. 204—141)

The present invention relates to the etching of tantalum metal.

It is advantageous to employ tantalum electrodes in electrolytic capacitors. There are a number of factors which tend to limit this use to a substantial extent. One of these is that tantalum foil is extremely difficult to etch so as to increase its effective area.

An object of the present invention is to provide a new etching procedure whereby etched tantalum electrodes may be readily and conveniently produced on a commercial scale. Other objects of the invention, as well as the advantages of it, will be apparent from the following description and claims.

Briefly, the above are achieved by etching tantalum electrolytically in a bath consisting of a salt of a fluorine substituted aliphatic acid containing 6 or less carbon atoms dissolved in a liquid non-aqueous organic solvent of formamides or related amides, nitriles and polyhydrate alcohols. Preferably, the aliphatic acid is substituted to the maximum possible extent, and is used in a concentration of from about 2 to about 25% by weight.

A number of specific aliphatic acid salts falling within the above limits can be used, either alone or in combination with one another. A preferred acid radical is derived from heptafluorobutyric acid. Other acid radicals are these derived from perfluorobutyric acid; pentafluoro propionic acid; nonafluoro valeric acid; undecafluoro hexoic acid, 3,3,4,4,4,pentafluorobutyric; 2,2,4,4,4,pentafluorobutyric; difluoroacetic acid; 3,3,3,trifluoropropionic acid; 2,2,3,3,4,4,hexafluorovaleric acid; or the like.

The cation in the salts used with the present invention can be of any known type provided the salt is sufficiently soluble in the solvent employed, and is best of a non-oxidizing nature. The preferred cations are potassium, lithium, sodium, and cesium because of their solubility, as well as the ease with which compounds containing the specific ions can be prepared.

The solvents employed in this invention can be varied. Liquid non-aqueous solvents capable of use include such materials as dimethylformamide, diethylformamide, and other related amides disclosed in the co-pending Ross application, Serial No. 575,790, filed April 3, 1956, and now abandoned; n-caprylo nitrile and related nitriles disclosed in the co-pending Taylor application, Serial No. 537,812, filed September 30, 1955, and now Patent No. 2,945,164. Also liquid polyhydrate alcohols that will dissolve the above salts are suitable, i.e. ethylene glycol.

The precise concentrations of the solute within any of the above solvents can be varied within wide limits. However, for purely practical reasons, it is preferred to use a concentration of from about 2 to about 25% by weight of a salt of a fluorine substituted aliphatic acid as indicated within one of the above solvents. Obviously, mixtures of one or more of the above solvents or one or more of the above solutes can be made within the scope of the present invention.

The temperatures employed during the etching can vary satisfactorily from about room temperature to about the boiling point of the etchant solution employed with satisfactory results. When etching tantalum foil of the usual thickness of from about .5 mil to about 3 mils, it is preferred to operate at approximately room temperature. As for etching commercially available tantalum foil with diameters of from 16 mils to about 25 mils, it is preferred to operate within a temperature range of from about 55° C. to about 70° C. Although it is possible to operate at temperatures to about 100° C. and obtain more rapid rate of etching this presents problems of vapor pressures of various components.

Further parameters which are relevant to the etching of tantalum are the density of the current used in the anodic etching of the metal and the total work done. With the tantalum foil of from .5 mil to about 3 mils, the current density should be within the range of 2 to 30 amperes per square foot of total surface area (both sides) of which in the optimum current density is about 14 amperes per square foot of total surface area. For the tantalum wire of a diameter of from 5 to 50 mils, the current density ranges from 50 to 200 amperes per square foot. With the 16 mil diameter wire, the optimum current density is about 100 amperes per square foot of real surface area, whereas for the 25 mil diameter wire, the optimum current density is about 130 amperes per square foot of surface area. In terms of total work done in etching the tantalum metal for the wire, it has been found that the amperes minutes is in the range of from about 100 to about 293 per square foot of area, whereas for the foil, it is 45 to about 300. In the anodic etching, the current is supplied by means of full wave or half wave rectified unfiltered alternating current. Other suitable power supplies, as well as their particular current configurations resulting from it, include those set forth in the Scherr et al. pending application Serial No. 493,412, filed March 10, 1955, and now abandoned.

The etching of the tantalum wire and foil is electrolytically accomplished in a bath comprising a solution of a salt of the above-mentioned fluorine substituted aliphatic acid in the above-mentioned solvents. The etching bath has a tendency to pick up moisture as indicated in examples hereinafter set forth. The absorption of water into the bath up to a few percent of moisture have been found to produce a unique etched product. If more than a few percent of moisture is picked up anodizing takes place which is inimical to the etching. By a few percent of moisture is meant less than aobut 4% by weight of water. Preferably water should be present in from 0.2% to about 4% by weight of the total system. While this preferred water percentage is preferable when high molecular weight solvents are employed, the permissible percentage of water may exceed the above-noted range.

It has also been determined according to this invention that the pH of the electrolytic system is a factor in the tantalum etching. It has been found that the pH is preferably at least slightly alkaline, and particularly above a pH of 8.5. A satisfactory pH range for the etching bath is from about 7.5 to about 10.5. Tantalum oxide is formed by the etching and tantalum oxide is dissolved in the alkaline electrolyte bath. By maintaining the pH in the indicated ranges a differential action is obtained at the tantalum by the etching process. This differential action acts preferentially on the tantalum oxide and thus serves to contribute to the improved etching of this invention. The anion or molecule through which the etching of the tantalum is effected does not hydrate, at least not readily. There is thus no attraction between the ions and water. This makes the fluorine substituted etching agents set forth above particularly applicable.

The following examples are indicative of the process of the invention as well as the novel products resulting therefrom. It is to be understood that these examples merely teach the practice of the invention and are not to be construed as limiting the invention in any way.

*Example I*

Pieces of 3 mil tantalum foil measuring about 2 centimeters by about 3½ centimeters were etched for a period of 10 minutes at 100 volts D.C. in a bath about 60 grams of sodium pentafluoropropionate dissolved in about 350 milliliters of dimethylformamide at a temperature of about 25° C.

The foil etched according to this example was formed at 100 volts in a 55% aqueous phosphoric acid solution with a leakage current of 50 milliamps and was found to have an etch ratio of about 5.

*Example II*

Pieces of 3 mil tantalum foil measuring about 2 centimeters by about 3½ centimeters were etched in a bath of 20 cubic centimeters of heptafluorobutyric acid dissolved in 300 cubic centimeters of formamide as follows:

The fresh bath was aged by etching a first piece of tantalum foil for 10 minutes at a temperature of between 97° and 98.5° C. under a voltage of 30 volts with a 1.5 ampere current.

After 18¼ hours the bath was filtered and a second piece of tantalum foil was etched in the filtered bath for 16 minutes at a temperature of from 96° to 100° C., a voltage of 10 volts with a current of 1 ampere.

The second piece of etched foil was formed at 100 volts and found to have a capacitance of 10 microfarads.

The bath was filtered and formamide solvent added. A third piece of tantalum foil was etched in the filtered bath for 17 minutes at a temperature of 96.5° to 99.5° C. at a voltage of 12 to 14 volts with a current of 1 ampere.

The third piece of etched foil was formed at 100 volts and was found to have a capacitance of 5 microfarads.

*Example III*

Pieces of 3 mil tantalum foil measuring about 2 centimeters by about 3½ centimeters were etched in a bath of 20 cubic centimeters of heptafluorobutyric acid dissolved in 300 cubic centimeters of formamide as follows:

The fresh bath was aged by etching a first piece of tantalum foil for 16 minutes at a temperature of about 97° C. under a voltage of 12 volts with a current of 1 ampere.

The bath was filtered and 58.5 cubic centimeters of formamide was added. After 2¼ hours the second piece of tantalum was etched in the filtered bath for 16 minutes at a temperature of from 97.5° to 99° C., 12 volts with 1 ampere current.

The second piece of tantalum was formed at 100 volts and was found to have a capacitance of 10 microfarads.

The bath was filtered and 28 cubic centimeters of formamide added. After 3 hours a third piece of tantalum foil was etched for 16 minutes at a temperature of 99° to 100° C. at a voltage of from 15 to 18 volts with 1 ampere current.

The third piece of foil was formed at 100 volts and was found to have a capacitance of 6.6 microfarads.

The process of this invention produces an etched surface having an increased etch ratio unknown in the art except as disclosed in our copending applications, Serial No. 338,139, filed February 20, 1953, by Preston Robinson and now abandoned; Serial No. 584,012, filed May 10, 1956, by Donald G. Rogers, and now abandoned, and the application of Preston Robinson for Etched Tantalum Foil, filed of even date, and Serial No. 460,074, filed October 4, 1954, and now Patent No. 2,900,579, by Donald G. Rogers.

Although the instant discussion has concerned itself solely with tantalum, it is to be understood that it is applicable to columbium and vanadium both as to the process and the capacitor embodying the product of the process whether it be an anode in wire or foil configuration.

As many apparently widely different embodiments of this invention may be made without departing from the spirit and scope hereof, it is to be understood that the invention is not limited to the specific embodiments hereof except as defined in the appended claims.

What is claimed:

1. A process for electro-chemically etching tantalum comprising anodic etching of tantalum by the organic anion of an at least slightly alkaline solution consisting of a salt of a fluorine substituted aliphatic acid of the group consisting of acetic, butyric, propionic, valeric and hexoic, in a solvent polyhydric alcohol, said solution containing a few percent of moisture.

2. A process for electro-chemically etching tantalum comprising anodic etching tantalum by the organic anion of an at least slightly alkaline solution consisting of a salt of a fluorine substituted aliphatic acid of the group consisting of acetic, butyric, propionic, valeric and hexoic, in a solvent polyhydric alcohol, said solution containing from about 0.2% to about 2% by weight of water.

3. A process for electro-chemically etching tantalum comprising anodic etching of tantalum by the organic anion of an at least slightly alkaline solution consisting of potassium trifluoroacetate in ethylene glycol, said solution containing from about 0.2% to about 4% by weight of water.

4. A process for electro-chemically etching tantalum comprising anodic etching of tantalum by an organic anion in an at least slightly alkaline solution of a salt of perfluorobutyric acid, in a solvent polyhydric alcohol, said solution containing a few percent of moisture.

5. A process for electro-chemically etching tantalum comprising anodic etching of tantalum by an organic anion in an at least slightly alkaline solution of a salt of pentafluoro propionic acid, in a solvent polyhydric alcohol, said solution containing a few percent of moisture.

6. A process for electro-chemically etching tantalum comprising anodic etching of tantalum by an organic anion in an at least slightly alkaline solution of a salt of nonafluoro valeric acid, in a solvent polyhydric alcohol, said solution containing a few percent of moisture.

7. A process for electro-chemically etching tantalum comprising anodic etching of tantalum by an organic anion in an at least slightly alkaline solution of a salt of undecafluoro hexoic acid, in a solvent polyhydric alcohol, said solution containing a few percent of moisture.

8. A process for electro-chemically etching tantalum comprising anodic etching of tantalum by an organic anion in an at least slightly alkaline solution of a salt of 3,3,4,4,4, pentafluorobutyric acid, in a solvent polyhydric alcohol, said solution containing a few percent of moisture.

9. A process for electro-chemically etching tantalum comprising anodic etching of tantalum by an organic anion in an at least slightly alkaline solution of a salt of 2,2,4,4,4,pentafluorobutyric acid, in a solvent polyhydric alcohol, said solution containing a few percent of moisture.

10. A process for electro-chemically etching tantalum comprising anodic etching of tantalum by an organic anion in an at least slightly alkaline solution of a salt of difluoroacetic acid, in a solvent polyhydric alcohol, said solution containing a few percent of moisture.

11. A process for electro-chemically etching tantalum comprising anodic etching of tantalum by an organic anion in an at least slightly alkaline solution of a salt of 3,3,3,trifluoropropionic acid, in a solvent polyhydric alcohol, said solution containing a few percent of moisture.

12. A process for electro-chemically etching tantalum comprising anodic etching of tantalum by an organic anion in an at least slightly alkaline solution of a salt of 2,2,3,3,4,4,hexafluorovaleric acid, in a solvent polyhydric alcohol, said solution containing a few percent of moisture.

References Cited in the file of this patent

UNITED STATES PATENTS

| 2,742,416 | Jenny | Apr. 17, 1956 |
| 2,863,811 | Ruscetta et al. | Dec. 8, 1958 |

FOREIGN PATENTS

| 691,509 | Great Britain | May 13, 1953 |